(12) United States Patent
Zhang et al.

(10) Patent No.: US 8,831,128 B2
(45) Date of Patent: Sep. 9, 2014

(54) MIMO COMMUNICATION SYSTEM SIGNAL DETECTION METHOD

(71) Applicant: Beihang University, Beijing (CN)

(72) Inventors: Jun Zhang, Beijing (CN); Qiang Gao, Beijing (CN); Xinxue Zhao, Beijing (CN); Younguang Zhang, Beijing (CN)

(73) Assignee: Beihang University, Beijing (CN)

( * ) Notice: Subject to any disclaimer, the term of this patent is extended or adjusted under 35 U.S.C. 154(b) by 0 days.

(21) Appl. No.: 13/975,374

(22) Filed: Aug. 26, 2013

(65) Prior Publication Data

US 2014/0140425 A1    May 22, 2014

(51) Int. Cl.
*H04B 7/04* (2006.01)

(52) U.S. Cl.
CPC .................................... *H04B 7/0456* (2013.01)
USPC ............ 375/267; 375/341; 375/340; 375/260

(58) Field of Classification Search
CPC ............ H04B 17/0042; H04B 7/0452; H04B 7/0456; H04B 25/03305; H04L 1/0631; H04L 2025/03726
USPC ................. 375/341, 260, 267, 340; 455/67.13
See application file for complete search history.

(56) References Cited

U.S. PATENT DOCUMENTS

| | | | |
|---|---|---|---|
| 2006/0146950 A1* | 7/2006 | Hoo | 375/267 |
| 2007/0041467 A1* | 2/2007 | Kim et al. | 375/267 |
| 2009/0304123 A1* | 12/2009 | Lee et al. | 375/341 |
| 2010/0124301 A1* | 5/2010 | Bahng et al. | 375/341 |
| 2010/0177837 A1* | 7/2010 | Leonidovich et al. | 375/267 |
| 2010/0239043 A1* | 9/2010 | Li et al. | 375/267 |
| 2010/0272205 A1* | 10/2010 | Bahng et al. | 375/267 |
| 2012/0327982 A1* | 12/2012 | Lee et al. | 375/219 |

OTHER PUBLICATIONS

Studer, C.; Fateh, S.; Seethaler, D., "ASIC Implementation of Soft-Input Soft-Output MIMO Detection Using MMSE Parallel Interference Cancellation," Solid-State Circuits, IEEE Journal of , vol. 46, No. 7, pp. 1754,1765, Jul. 2011.*

Jianxuan Du; Ye Li, "Parallel detection of space-time codes by predictive soft interference cancellation," Communications, 2004 IEEE International Conference on , vol. 5, no., pp. 2746,2750 vol. 5, Jun. 20-24, 2004.*

* cited by examiner

*Primary Examiner* — Daniel Washburn
*Assistant Examiner* — Amneet Singh

(57) ABSTRACT

The present invention discloses a MIMO communication system signal detection method applied to a MIMO (Multiple Input Multiple Output) system with m transmitting antennas and n receiving antennas. The method comprises the following steps: acquiring the channel (from m transmitting antennas to n receiving antennas) matrix H by using a channel estimation algorithm; calculating a transmitted signal preliminary estimation vector $[\hat{x}_1, \hat{x}_2, \ldots, \hat{x}_m]^T$; dividing said m transmitting antennas into groups; obtaining at least one possible transmitted signal vectors for each group of transmitted signals by using signal detection technique; and finally obtaining possible transmitted signal vectors for all groups of transmitting antennas, combining each group of possible transmitted signal vectors into a m-dimensional possible transmitted signal vector in a logic relationship of tree structure, and forming a set of transmitted signal candidate vectors S from said m-dimensional possible transmitted signal vectors; obtaining a ML solution from said set of transmitted signal candidate vectors S with a ML detection algorithm.

9 Claims, 2 Drawing Sheets

MIMO COMMUNICATION SYSTEM SIGNAL DETECTION METHOD

CROSS-REFERENCE TO RELATED APPLICATIONS

This application claims the priority benefit of Chinese patent application No. 201210470608.1, filed on Nov. 19, 2012. The entirety of the above-mentioned patent application is hereby incorporated by reference herein and made a part of specification.

BACKGROUND OF THE INVENTION

1. Field of the Invention

The present invention relates to the filed of MIMO (Multiple-input Multiple-output) communication technology, and particularly to a signal detection method.

2. Background of the Invention

The spatially multiplexed (SM) MIMO (Multiple-Input Multiple-Output) technique can achieve a relatively high data transfer rate without increasing spectral bandwidth or transmit power, and thus has been greatly developed as a key technique in the fourth generation mobile communication. In a SM MIMO communication system, the data transfer rate can be increased proportionally by increasing the number of transmitting antennas and using a higher order modulation. Increasing the number of transmitting antennas can proportionally increase the number of spatially transmitted data streams, thus proportionally increasing the data transfer rate. A higher order modulation can expand the modulation constellation set, increase the information content carried by each bit, and thus increase the data transfer rate of each single data stream. However, since the signal received by each receiving antenna is always a mix of all the transmitted signals after passing through different channels, increase in the number of the transmitting antennas will increase the interference between the transmitted signals. In a higher order modulation, the larger a modulation constellation is, the smaller the Euclidean distance between symbols is, which indicates a larger interference between the symbols. Therefore, the spatial multiplexed MIMO communication system increases the data transfer rate at the cost of greatly increasing difficulty in signal detection.

The conventional ML (Maximum Likelihood) algorithm is the best signal detection technique in a MIMO system. It is an ergodic searching algorithm which searches the candidate transmitted vector with a minimum Euclidean distance between its channel response and the received signals. However, the complexity of the ML algorithm can be extremely high when the constellation or the number of transmitted antennas is large, which makes it not conducive for an engineering implementation. There are also various signal detection methods with a lower complexity, including linear detection and nonlinear detection algorithm. However, decrease in the computational complexity usually leads to a increase in the bit error rate. Linear detection algorithms, such as the ZF (Zero Forcing) algorithm and the LMMSE (Linear Minimum Mean Square Error) algorithm, have the lowest computational complexity, but the bit error rate is relatively high, which results in that the linear detection algorithms are not qualified in terms of detection accuracy and thus can not be used directly in reality. Nonlinear detection algorithms, such as the V-BLAST (Vertical Bell Laboratories Layered Space Time) algorithm, the PIC (Parallel Interference Cancellation) algorithm and the SD (Sphere Decoding) algorithm, have a lower bit error rate but a higher computational complexity. To find a signal detection method with a good compromise between detection accuracy and computational complexity has become a hot topic in research.

BRIEF SUMMARY OF THE INVENTION

The present invention provides a MIMO communication system signal detection method for solving the problem that a low detection bit error rate is at the cost of a high computational complexity and a computational complexity will lead to a high detection bit error rate.

To solve the above problem, the technical solution of the present invention lies in a signal detection method being applied to a MIMO communication system with m transmitting antennas and n receiving antennas, wherein each transmitting antenna transmits a signal, while each receiving antenna receives all of m transmitted signals, the method comprising:

s step 1, acquiring the received signals at said n receiving antennas from all of m transmitted signals, forming a received signal vector y, extracting channel information contained in the received signals of said n receiving antennas, and acquiring a channel matrix H from m transmitting antennas to n receiving antennas by using a channel estimation algorithm;

step 2, from the received signal vector y, calculating a m-dimensional transmitted signal preliminary estimation vector $[\hat{x}_1, \hat{x}_2, \ldots, \hat{x}_m]^T$, which corresponds to the m transmitted signals of said m transmitting antennas;

step 3, dividing said m transmitting antennas into groups, wherein each group consists of two transmitting antennas, and if appropriate, the last remaining transmitting antenna constitutes a group by itself;

step 4, from the channel matrix H, the received signal vector y, and the transmitted signal preliminary estimation vector of transmitting antennas except the group of transmitting antennas to be calculated, calculating a received signal component vector on said n receiving antennas which corresponds to transmitted signals of said group of transmitting antennas, and acquiring at least one possible transmitted signal vectors of said group of transmitted signal from said received signal component vector and said channel matrix H by using signal detect technique;

step 5, replacing a corresponding value in the m-dimensional transmitted signal preliminary estimation vector $[\hat{x}_1, \hat{x}_2, \ldots, \hat{x}_m]^T$ with each of the possible transmitted signal vectors from step 4, respectively, repeating step 4, calculating at least one possible transmitted signal vectors of transmitted signals of the next group of transmitting antennas with respect to the possible transmitted signal vector of each of the previous group of transmitting antennas, and finally obtaining the possible transmitted signal vectors of a tree structure of all groups of transmitting antennas;

step 6, composing a m-dimensional transmitted signal candidate vector from the possible transmitted signal vectors to which each leaf node of the tree structure and all ancestor nodes on the parent node path of the leaf node correspond, thus forming a complex m-dimensional transmitted signal candidate vectors which form a set of transmitted signal candidate vectors S;

step 7, obtaining a ML solution from said set of transmitted signal candidate vectors S with a ML detection algorithm, said ML solution being a signal detection result of the m transmitted signals.

Preferably, in said signal detection method, in said step 2, calculating said m-dimensional transmitted signal preliminary estimation vector $[\hat{x}_1, \hat{x}_2, \ldots, \hat{x}_m]^T$ with a LMMSE algorithm by using the following equation:

$$\hat{x} = (H^H H + \sigma^2 I)^{-1} H^H y,$$

wherein $\hat{x}=[\hat{x}_1, \hat{x}_2, \ldots, \hat{x}_m]^T$, $\sigma^2$ is a channel noise variance, $H^H$ is a hermit matrix of said channel matrix H, I is a unit matrix with a same dimension as that of $H^H H$, and y is a received signal vector composed by the n receiving-antenna received signals.

Preferably, in said signal detection method, H is a channel matrix of a dimension of n×m, and the element $h_{ji}$, i=1, 2, ..., m, j=1, 2, ..., n in the channel matrix indicates an impulse response of a subchannel from the $i^{th}$ transmitting antenna to the $j^{th}$ receiving antenna.

Preferably, in said signal detection method, in said step 4, calculating a received signal component on said n receiving antennas which corresponds to transmitted signals of said group of transmitting antennas is accomplished by:

assuming that said group of transmitting antennas is the first group of transmitting antennas comprising the first and second transmitting antennas, then the received signal component vector for transmitted signals of the first and second transmitting antennas on said n receiving antennas is:

$$y_{12}=y-h_3\hat{x}_3-h_4\hat{x}_4-\ldots-h_m\hat{x}_m,$$

wherein $h_i$, i=3, 4, ... m is a column vector of the channel matrix H, which indicates a vector composed by impulse responses of signal transmitted by the $i^{th}$ transmitting antenna on the n receiving antennas, $y_{12}$ is a received signal component vector of the first group of transmitted signals on said n receiving antennas, y is a received signal vector composed by the n receiving-antenna received signals.

Preferably, in said signal detection method, in said step 4, acquiring at least one possible transmitted signal vectors of said group of transmitted signal from said group of received signal component vectors and said channel matrix H is accomplished by:

assuming that said group of transmitting antennas is the first group of transmitting antennas, and firstly calculating the parameters $a_1$, $a_2$, $b_1$, $b_2$, $c_1$, and $c_2$:

$$a_1=h_2^H y_{12},\ b_1=h_2^H h_1,$$

$$c_1=h_2^H h_2;$$

$$a_2=h_1^H y_{12},\ b_2=h_1^H h_2,$$

$$c_2=h_1^H h_1;$$

wherein $h_1$ and $h_2$ are column vectors of the channel matrix H, which indicate respectively vectors composed by impulse responses of signals transmitted by the first and second transmitting antennas on the n receiving antennas, $y_{12}$ is a received signal component vector of the first group of transmitted signals on said n receiving antennas, constructing a first modulation constellation point set Ω from the modulation order of said MIMO communication system with m transmitting antennas and n receiving antennas, wherein the first constellation point set Ω comprises |Ω| elements, said elements are complex symbols, and |Ω| corresponds to the modulation order of said MIMO communication system;

setting respective elements in the first modulation constellation point set Ω as complex symbols $x_1$ which will be possibly transmitted by the first transmitting antenna, and substituting them into the first function:

$$x_2 = \operatorname*{argmin}_{x \in \Omega} |x - (a_1 - b_1 x_1)/c_1|;$$

the element in the first constellation point set Ω which has the minimum distance between $(a_1-b_1 x_1)/c_1$, as a complex symbol $x_2$ which is most possibly transmitted by the second transmitting antenna at the time the first transmitting antenna transmits the complex symbols $x_1$;

from the respective complex symbols $x_2$ which are most possibly transmitted by the second transmitting antenna, getting an element in the first constellation point set Ω which has the minimum distance between $(a_2-b_2 x_2)/c_2$, as a complex symbol $x_1'$ which is most possibly transmitted by the first transmitting antenna at the time the second transmitting antenna transmit the complex symbols $x_2$ by using the second function:

$$x_1' = \operatorname*{argmin}_{x \in \Omega} |x - (a_2 - b_2 x_2)/c_2|;$$

for the same $x_2$, comparing its corresponding $x_1$ and $x_1'$; if equal, setting $[x_1,x_2]^T$ as possible transmitted signal vectors for the first group of transmitted signals, and combining the qualified $[x_1,x_2]^T$ into a set of possible transmitted signal vectors for the first group of transmitted signals $S_1$, namely, $[x_1,x_2]^T \in S_1$; if not equal, abandoning the corresponding $x_1$ and $x_1'$;

wherein $$Q(x) = \operatorname*{argmin}_{x \in \Omega} |x - (a_i - b_i x_i)/c_i|,\ i = 1, 2, \ldots, m,$$

namely, the function value is an element in the first constellation point set Ω which has the minimum distance between $(a_i-b_i x_i)/c_i$.

Preferably, in said signal detection method, in said step 4, calculating said group of received signal components for the transmitted signals of said group of transmitting antennas on said n receiving antennas is accomplished by:

assuming that said group of transmitting antennas is a second group of transmitting antennas comprising the third and fourth transmitting antennas, wherein one of the possible transmitted signal vectors for the first group of transmitting antennas has replaced the m-dimensional transmitted signal preliminary estimation vectors $\hat{x}_1$, $\hat{x}_2$ and become $x_1$ and $x_2$:

$$y_{34}=y-h_1 x_1-h_2 x_2-h_5\hat{x}_5-\ldots-h_m\hat{x}_m,$$

wherein $[x_1,x_2]^T \in S_1$, namely, the possible number of $y_{34}$ depends on the number of $[x_1,x_2]^T$ contained in the set of possible transmitted signal vectors for the first group of transmitting antennas $S_1$, $y_{34}$ is a received signal component vector for the second group of transmitted signals on said n receiving antennas, y is the received signal vector composed by the n receiving-antenna received signals.

Preferably, in said signal detection method, in said step 4, acquiring at least one possible transmitted signal vectors of said group of transmitted signal from said group of received signal component vectors and said channel matrix H by using signal detection technique is accomplished by:

assuming that said group of transmitting antennas is the second group of transmitting antennas, firstly calculating the parameter $a_3$, $a_4$, $b_3$, $b_4$, $c_3$, and $c_4$:

$$a_3=h_4^H y_{34},\ b_3=h_4^H h_3,\ c_3=h_4^H h_4;$$

$$a_4=h_3^H y_{34},\ b_4=h_3^H h_4,\ c_4=h_3^H h_3;$$

and based on said function Q(x), obtaining the set of possible transmitted signal vectors for the second group of transmitted signals $S_2$ to which respective $y_{34}$ corresponds, wherein the number of $S_2$ depends on the possible number of $y_{34}$.

Preferably, in said signal detection method, in said step 7, obtaining a ML solution from said set of transmitted signal candidate vectors S with a ML detection algorithm is accomplished by:

substituting each candidate vector in said set of transmitted signal candidate vectors S into the Euclidean distance calculating equation:

$$PED=\|y-h_1x_1-h_2x_2-\ldots-h_mx_m\|^2,$$

wherein $h_i$, $i=1, 2, \ldots, m$, is a column vector of the channel matrix H, which indicates a vector of impulse response of the signal transmitted by the $i^{th}$ transmitting antenna on the n receiving antennas, y is a received signal vector composed by the n receiving-antenna received signals, $x_1, x_2, \ldots, x_m$ are the calculated transmitted complex symbols form the first to $m^{th}$ transmitting antennas.

Preferably, in said signal detection method, when the number of transmitting antennas m is an even number, the transmitted signal vector for the last group of transmitting antennas is always the transmitted signal preliminary estimation vector, and is not replaced by the calculated value. In the present invention, the transmitted signals are divided into groups and each group comprises two transmitted signals, and the set of possible transmitted signal vectors for each group of transmitted signals is reconstructed from the received signal component vectors at the receiver side to which each group of transmitted signals correspond and from a channel matrix. Each group of possible transmitted signal vectors are combined to form a set of transmitted signal candidate vectors which has the same number as that of the transmitting antennas. In this way, the range of the set of possible transmitted signal vectors is greatly reduced, so that the complexity is finally reduced greatly by using a ML detection algorithm. Therefore, a good compromise is reached between detection accuracy and detection complexity, and the realizability of the real system is improved.

DETAILED DESCRIPTION OF THE INVENTION

Figure 1:
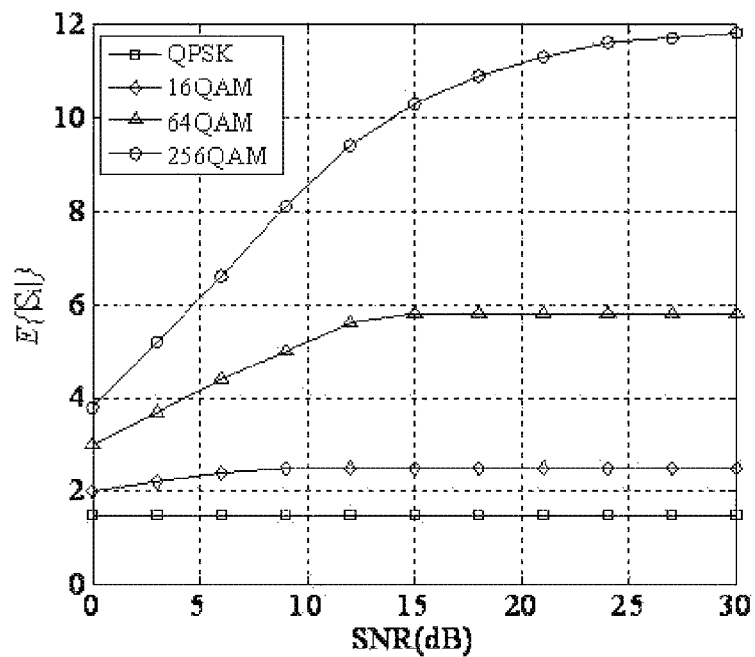
FIG. 1 illustrates graphs representing a simulation of expectation for the number of transmitted signal vectors in the set of possible transmitted signal vectors for each group of transmitting antennas by applying the present method.

The present invention will be described hereinafter with reference to the accompanying drawings, so that the skilled in the art can carry out the present invention by referring to the description.

In a MIMO communication system with m transmitting antennas and n receiving antennas, each transmitting antenna transmits a signal, while each receiving antenna receives all of m transmitted signals. Due to the interference between transmitted signals, the receiving antennas, upon the receiving signals, can not determine accurately the real signal transmitted by each transmitting antenna. Therefore, it is necessary to detect the real transmitted signals. The present invention provides a signal detection method. The transmitted signals are independent to each other, and in an environment with rich scattering paths, $x=[x_1, x_2, \ldots, x_m]^T$ is defined as a transmitted signal vector. Here, $x_i$, $i=1, 2, \ldots, m$, is a transmitted signal on the $i^{th}$ transmitting antenna, namely, the final value to be obtained by the present method. m is the number of transmitting antennas. Generally, the vector is in a complex form (except a Binary Phase Shift Keying signal). $y=[y_1, y_2, \ldots, y_n]^T$ is defined as a received signal vector. Here, $y_j$, $j=1, 2, \ldots, n$, is received signals on the $j^{th}$ receiving antenna, namely, the first value which can be measured in the present method. n is the number of receiving antennas. The vector is also in a complex form $z=[z_1, z_2, \ldots, z_n]^T$ is a noise vector in a complex form. H is a channel matrix with the dimension of n×m, wherein $h_{ji}$, $i=1, 2, \ldots, m, j=1, 2, \ldots, n$ indicates an impulse response of a subchannel from the $i^{th}$ transmitting antenna to the $j^{th}$ receiving antenna. The relationship between the transmitted signal and the received signal can be expressed by: $y=Hx+z$. Namely, what is received by each antenna is a mix of m signals which are transmitted from the transmitter side, effected by its respective subchannel, and add some noise. y can be measured, H can be estimated, while z is unknown. Thus, x can be obtained, namely the transmitted signals.

To obtain x, namely the transmitted signals more accurately, the present invention provides a MIMO communication system signal detection method with m transmitting antennas and n receiving antennas. The method comprises steps of:

acquiring the received signals at said n receiving antennas from all of m transmitted signals, forming a received signal vector y, extracting channel information contained in the received signals of said n receiving antennas, and acquiring a channel matrix $H=[h_{ji}]n×m$ by using a channel estimation algorithm, wherein $h_{ji}$, $i=1, 2, \ldots, m, j=1, 2, \ldots, n$, is an impulse response of a subchannel from the $i^{th}$ transmitting antenna to the $j^{th}$ receiving antenna. The channel estimation algorithm mentioned here comprises, but not limited to, the existing algorithm like the least square algorithm, minimum mean square error algorithm, transform domain algorithm, and the present invention is not limited in this regard. The channel estimation algorithms are mature techniques in the prior art.

from the received signal vector y, calculating a m-dimensional transmitted signal preliminary estimation vector $[\hat{x}_1, \hat{x}_2, \ldots \hat{x}_m]^T$, which corresponds to the m transmitted signals of said m transmitting antennas. The present invention obtains firstly an estimated value of the transmitted signal, and obtains the exact value gradually by substituting the calculated value into an equation for calculating the transmitted signal iteratively.

It is preferred in the present invention to apply the LMMSE algorithm during preliminary estimation of the m-dimensional transmitted signal for said n receiving antennas, namely, by using the following equation:

$$\hat{x}=(H^HH+\sigma^2I)^{-1}H^Hy,$$

wherein $\sigma^2$ is a noise variance, $H^H$ is a conjugate transpose matrix of said channel matrix H, I is a unit matrix of the same dimension as that of $H^HH$, y is a received signal vector composed by the n receiving-antenna received signals, $\hat{x}=[\hat{x}_1, \hat{x}_2, \ldots, \hat{x}_m]^T$ is a m-dimensional transmitted signal preliminary estimation vector, which corresponds to the m transmitted signals of said m transmitting antennas.

dividing said m transmitting antennas into groups, wherein each group consists of two transmitting antennas, and if appropriate, the last remaining transmitting antenna constitutes a group by itself;

in particular, this step comprises:

setting
$G_1=[x_1,x_2]^T, G_2=[x_3,x_4]^T, \ldots, G_{m/2}=[x_{m-1},x_m]^T$, m is an even number, or
$G_1=[x_1,x_2]^T, G_2=[x_3,x_4]^T, \ldots, G_{(m-1)/2}=[x_{m-2}, x_{m-1}]^T$, $G_{(m+1)/2}=[x_m]$, m is an odd number;

wherein $G_i$, i=1, 2, ... m/2, or m+1/2 is each group of transmitted signals vectors after dividing.

obtaining the set of possible transmitted signal vectors for each group of transmitted signals:

the method for obtaining possible transmitted signal vectors for transmitted signals can be referred to as modified parallel interference cancellation (MPIC) algorithm, which comprises:

from the channel matrix H, the received signal vector y, and the transmitted signal preliminary estimation vector of transmitting antennas except the group of transmitting antennas to be calculated, obtaining a received signal component vector on said n receiving antennas which corresponds to the first group of transmitted signals. The first group of transmitting antennas comprises the first and second transmitting antennas, and their transmitted signals are $x_1$ and $x_2$.

For example, the following equation is applied to cancel interference from transmitted signals in said n receiving-antenna received signals other than the first group of transmitted signals:

$$y_{12}=y-h_3\hat{x}_3-h_4\hat{x}_4-\ldots-h_m\hat{x}_m,$$

wherein $h_i$, i=3, 4, ..., m, is a column vector of the channel matrix H, which indicates a vector composed by impulse responses of signal transmitted by the $i^{th}$ transmitting antenna on the n receiving antennas. The above equation cancels $h_1$ and $h_2$ which are the impulse responses of the first group of transmitting antennas on the n receiving antennas correspond, while all the other impulse responses of the remaining transmitting antennas on the n receiving antennas have been included and multiplied by the corresponding estimation signal $\hat{x}_i \cdot y_{12}$ is a received signal component vector of the first group of transmitted signals on said n receiving antennas.

Secondly, acquire at least one possible transmitted signal vectors of said group of transmitted signal from said group of received signal component vectors and said channel matrix H. For example, a set of possible transmitted signal vectors for the first group of transmitted signals $S_1$ is obtained by the following method:

1) calculating the following parameters:

$$a_1=h_2^H y_{12}, b_1=h_2^H h_1,$$

$$c_1=h_2^H h_2;$$

$$a_2=h_1^H y_{12}, b_2=h_1^H h_2,$$

$$c_2=h_1^H h_1;$$

2) constructing a first modulation constellation point set $\Omega$ from the modulation order of said MIMO communication system with m transmitting antennas and n receiving antennas. The first constellation $\Omega$ comprises $|\Omega|$ elements, said elements are complex symbols, and $|\Omega|$ corresponds to the modulation order of said m×n MIMO communication system.

For example, in a 16 QAM (Quadrature Amplitude Modulation) modulated system, the modulation constellation contains 16 modulation constellation points, namely, the number of elements $|\Omega|$ in the constellation $\Omega$ is 16, and the elements are:

$$\frac{1+j}{\sqrt{10}}, \frac{1+3j}{\sqrt{10}}, \frac{3+j}{\sqrt{10}}, \frac{3+3j}{\sqrt{10}}, \frac{1-j}{\sqrt{10}}, \frac{1-3j}{\sqrt{10}}, \frac{3-j}{\sqrt{10}},$$

$$\frac{3-3j}{\sqrt{10}}, \frac{-1+j}{\sqrt{10}}, \frac{-1+3j}{\sqrt{10}}, \frac{-3+j}{\sqrt{10}}, \frac{-3-3j}{\sqrt{10}},$$

$$\frac{-1-j}{\sqrt{10}}, \frac{-1-3j}{\sqrt{10}}, \frac{-3-j}{\sqrt{10}}, \frac{-3-3j}{\sqrt{10}}$$

wherein j indicates a complex symbol, and $j=\sqrt{-1}$.

It is noted that, the above QAM modulation is a vector modulation. The input data bits are firstly mapped (generally in a Gray code) onto a complex plane (a constellation), thus forming a complex modulated symbol. Then, the I, Q components (corresponding to the real part and imaginary part of the complex plane, i.e., the horizontal and vertical directions) of the complex modulated symbol are accordingly modulated onto two orthogonal carriers. For example, a 16 QAM modulated signal comprises 16 samples, each sample indicates a complex symbol, namely, the 16 modulation constellation points as discussed above.

3) setting respective elements in the first modulation constellation $\Omega$ as complex symbols $x_1$ which will be possibly transmitted by the first transmitting antenna, and substituting them into the first function:

$$x_2 = \arg\min_{x \in \Omega}|x - (a_1 - b_1 x_1)/c_1|,$$

the element in the first constellation point set $\Omega$ which has the minimum distance between $(a_1-b_1x_1/c_1$, as a complex symbol $x_2$ which is most possibly transmitted by the second transmitting antenna at the time the first transmitting antenna transmits the complex symbols $x_1$ (namely, one of the possible transmitted signal vectors for the second transmitting antenna);

4) from the respective complex symbols $x_2$ which are most possibly transmitted by the second transmitting antenna, getting an element in the first constellation point set $\Omega$ which has the minimum distance between $(a_2-b_2x_2)/c_2$, as a complex symbol $x_1'$ which is most possibly transmitted by the first transmitting antenna at the time the second transmitting antenna transmit the complex symbols $x_2$ by using the second function:

$$x_1' = \arg\min_{x \in \Omega}|x - (a_2 - b_2 x_2)/c_2|;$$

5) for the same $x_2$, comparing its corresponding $x_1$ and $x_1'$; if equal, setting $[x_1,x_2]^T$ as possible transmitted signal vectors for the first group of transmitted signals, and combining the qualified $[x_1,x_2]^T$ into a set of possible transmitted signal vectors for the first group of transmitted signals $S_i$, namely, $[x_1,x_2]^T \in S_1$; if not equal, abandoning the corresponding $x_1$ and $x_1'$;

wherein $$Q(x) = \arg\min_{x \in \Omega}|x - (a_i - b_i x_i)/c_i|, i = 1, 2, \ldots, m,$$

namely, the function value is an element in the first constellation point set $\Omega$ which has the minimum distance between $(a_i-b_ix_i)/c_i$, FIG. 1 illustrates graphs representing, under different modulation modes (four in FIG. 1), a simulation of the expected number of transmitted signal vectors in the set of possible transmitted signal vectors for each group of transmitting antennas by applying the present method. The horizontal axis is a signal-noise ratio, and the vertical axis is the expected number of transmitted signal vectors in the set of transmitted signal vectors. FIG. 1 not only illustrates difference in number for different modulation modes, but also the change of the expected number of vectors with the signal-noise ratio.

As can be seen from FIG. 1, the larger the modulation constellation is, the larger the number of transmitted signal vectors in the set of possible transmitted signal vectors (candidate vector set) is. In QPSK modulation, the number of modulation constellation points is 4, and the expected number of transmitted signal vectors in the candidate vector set is 1.5. In 16 QAM modulation, the number of modulation constellation points is 16, and the expected number of transmitted signal vectors in the candidate vector set is 2.5. In 64 QAM modulation, the number of modulation constellation points is 64, and the expected number of transmitted signal vectors in the candidate vector set is 6. In 256 QAM modulation, the number of modulation constellation points is 256, and the expected number of transmitted signal vectors in the candidate vector set is 12. As can be seen, for a 2×2 system (i.e., a MIMO communication system with 2 transmitting antennas and 2 receiving antennas), in order to obtain the optimal solution in the set of possible transmitted signal vectors $S_1$ by applying the ML detection algorithm of the invention, it is required to calculate the Euclidean distance only for 1.5 times on average in QPSK modulation. Similarly, it is required to calculate the Euclidean distance only for 2.5 times on average in 16 QAM modulation.

After obtaining the set of possible transmitted signal vectors for the first group of transmitted signals $S_1$, the received signal component vector for the second group of transmitted signals on said n receiving antennas is calculated. This comprises:

firstly applying the following equation to cancel interference from transmitted signals in said n receiving-antenna received signals other than the second group of transmitted signals:

$$y_{34}=y-h_1x_1-h_2x_2-h_5\hat{x}_5-\ldots-h_m\hat{x}_m,$$

wherein $[x_1,x_2]^T \in S_1$. Namely, the possible number of $y_{34}$ depends on the number of $[x_1,x_2]^T$ contained in the set of possible transmitted signal vectors for the first group of transmitting antennas $S_1$.

furthermore, based on the received signal vectors of the second group of transmitted signals and said channel matrix H, obtaining the set of possible transmitted signal vectors for the second group of transmitted signals $S_2$:

1) calculating the following parameters:

$$a_3=h_4^H y_{34},\ b_3=h_4^H h_3,\ c_3=h_4^H h_4;$$

$$a_4h_3^H y_{34},\ b_4=h_3^H h_4,\ c_4=h_3^H h_3;$$

and based on said function $Q(x)$, obtaining the set of possible transmitted signal vectors for the second group of transmitted signals $S_2$ to which respective $y_{34}$ corresponds, wherein the number of $S_2$ depends on the possible number of $y_{34}$.

2) for $S_2$ to which each $y_{34}$ corresponds to, performing the calculation by:

setting each element in the first constellation point set $\Omega$ as the complex symbol $x_3$ which is possibly transmitted by the third transmitting antenna, and substituting them into the function:

$$x_4 = \underset{x \in \Omega}{\operatorname{argmin}} |x - (a_3 - b_3x_3)/c_3|$$

solving an element in the first constellation point set $\Omega$ which has the minimum module for its difference between $(a_3-b_3x_3)/c_3$, as a complex symbol $x_4$ which is most possibly transmitted by the fourth transmitting antenna at the time the third transmitting antenna transmits the complex symbols $x_3$;

from the complex symbol $x_4$ which is most possibly transmitted by the fourth transmitting antenna, the element in the first constellation point set $\Omega$ which has the minimum module for its difference between $(a_4-b_4x_4)/c_4$, as a complex symbol $x_3'$ which is most possibly transmitted by the third transmitting antenna at the time the fourth transmitting antenna transmit the complex symbols $x_4$ by using the function:

$$x_3' = \underset{x \in \Omega}{\operatorname{argmin}} |x - (a_4 - b_4x_4)/c_4|;$$

for the same $x_4$, comparing its corresponding $x_3$ and $x_3'$; if equal, setting $[x_3,x_4]^T$ as possible transmitted signal vectors for the second group of transmitted signals, and combining the qualified $[x_3,x_4]^T$ into a set of possible transmitted signal vectors for the second group of transmitted signals $S_2$; if not equal, abandoning the corresponding $x_3$ and $x_3'$.

Figure 2:
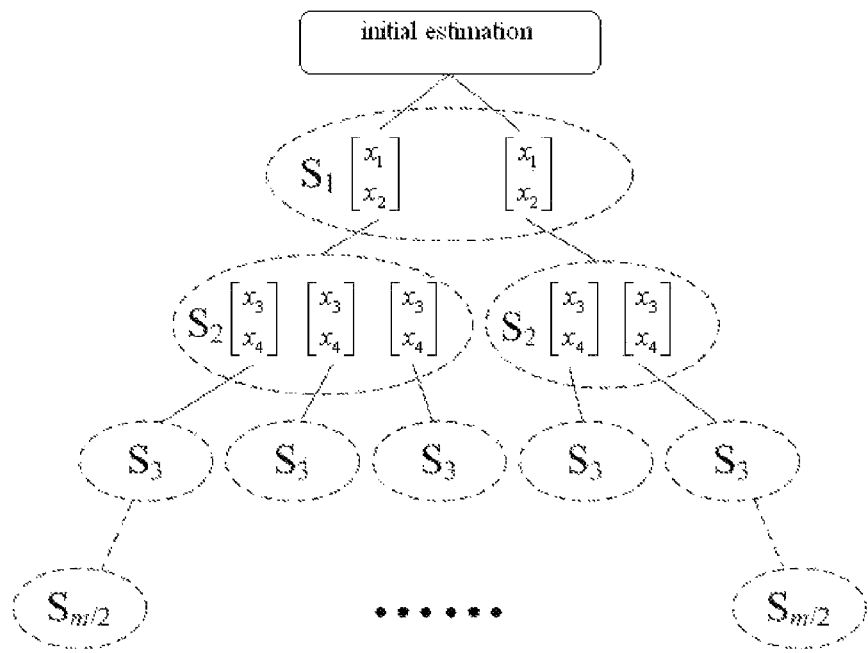
FIG. 2 is a logic diagram illustrating the set of possible transmitted signal vectors for each group of transmitted signals.

Then, based on the previously obtained set of transmitted signal vectors, the set of possible transmitted signal vectors for the next group of transmitted signals is obtained sequentially. The logic relationship between the set of possible transmitted signal vectors for each group of transmitted signals is shown in FIG. 2. For example, the first group of transmitted signals obtains 2 possible transmitted signal vectors $$\begin{bmatrix} x_1 \\ x_2 \end{bmatrix}.$$

By taking each $$\begin{bmatrix} x_1 \\ x_2 \end{bmatrix}$$

in the 2 possible transmitted signal vectors $$\begin{bmatrix} x_1 \\ x_2 \end{bmatrix}$$

as a root node, the received signal vector for the second group of transmitted signals on said n receiving antennas can be obtained from the value of the root node $$\begin{bmatrix} x_1 \\ x_2 \end{bmatrix}.$$

By combining with the channel matrix H, the possible transmitted signal vector for the second group of transmitted signals at each root node is obtained as a child node of the root node. The child node corresponding to the first root node is $$\begin{bmatrix} x_3 \\ x_4 \end{bmatrix} \begin{bmatrix} x_3 \\ x_4 \end{bmatrix} \begin{bmatrix} x_3 \\ x_4 \end{bmatrix},$$

while the child node corresponding to the second root node is $$\begin{bmatrix} x_3 \\ x_4 \end{bmatrix} \begin{bmatrix} x_3 \\ x_4 \end{bmatrix}.$$

Based on the value of a child node, e.g., $S_2$ $$\begin{bmatrix} x_3 \\ x_4 \end{bmatrix} \begin{bmatrix} x_3 \\ x_4 \end{bmatrix} \begin{bmatrix} x_3 \\ x_4 \end{bmatrix},$$

and values of all ancestor nodes on the child node path, e.g., the first root node $$\begin{bmatrix} x_1 \\ x_2 \end{bmatrix},$$

the received signal vector for the next group of transmitted signal on said n receiving antennas is obtained. Further, by combining said channel matrix H, the possible transmitted signal vector for this group of transmitted signals under each child node is obtained as a lower child node for this child node, as shown by a plurality of $S_3$ in FIG. 2. This is conducted until the possible transmitted signal vector for the last group of transmitted signals is obtained as the leaf node of the tree structure. In other words, each child node is calculated from the parent node on its generation path and the parent node of the parent node (i.e., all ancestor nodes).

It is noted that, the number of the set of possible transmitted signal vectors for the next group of transmitted signals depends on the number of possible received signal component vectors for this group of transmitted signals on said n receiving antennas, and the number of possible received signal component vectors for said group of transmitted signals depends on the number of the total possible transmitted signal vectors of the previous group of transmitted signal.

When the number of transmitting antennas m is an even number, only one transmitted signal is contained in the last group of transmitted signals vectors. There is only one set of possible transmitted signal vectors for this group of transmitted signals, and its element is composed by the preliminary estimation vector of itself. In other words, the last group of transmitted signals vectors is not subject to any processing.

A m-dimensional transmitted signal candidate vector is composed from the possible transmitted signal vectors to which each leaf node of the tree structure and all ancestor nodes on the parent node path correspond, thus forming a plurality of m-dimensional transmitted signal candidate vectors which form a set of transmitted signal candidate vectors S. Specifically, this step comprises:

starting from each vector in the set of possible transmitted signal vectors for the last group of transmitted signals, combining the vector with a vector in the corresponding set of possible transmitted signal vectors for the previous group of transmitted signals progressively, until the m-dimensional transmitted signal candidate vectors are obtained (m is the number of transmitting antennas), and constructing a set of transmitted signal candidate vectors S from the plurality of m-dimensional transmitted signal candidate vectors. For example, as shown in FIG. 2, the leftmost $S_{m/2}$, $S_3$, $S_2$ $$\begin{bmatrix} x_3 \\ x_4 \end{bmatrix},$$

and $S_1$ $$\begin{bmatrix} x_1 \\ x_2 \end{bmatrix}$$

are combined, which is corresponded to the leaf node of the tree structure and its all ancestor nodes on the parent node path and, thus forming a m-dimensional candidate transmitted signal vector. In other words, each full path in the finally formed tree structure is a m-dimensional candidate transmitted signal vector, and thus the number of candidate transmitted vectors in the set of candidate transmitted signal vectors S equals to that of the leaf nodes.

Reference to a 4×4 MIMO communication system by applying QAM modulation. Assuming that there are 2 possible transmitted signal vectors in $S_1$, and there are 3 possible transmitted signal vectors in $S_2$ which the first possible transmitted signal vector in $S_1$ corresponds to, these 3 possible transmitted signal vectors $[x_3,x_4]^T$ in $S_2$ are combined respectively with the first possible transmitted signal vector $[x_1,x_2]^T$ in $S_1$ and form into a 4-dimensional transmitted signal candidate vector $[x_1,x_2,x_3,x_4]$T. Similarly, assuming that there are 2 possible transmitted signal vectors in $S_2$ which the second possible transmitted signal vector in $S_1$ corresponds to, these 2 possible transmitted signal vectors $[x_3,x_4]^T$ in $S_2$ are combined respectively with the second candidate transmitted vector $[x_1,x_2]^T$ in $S_1$ and form into a 4-dimensional transmitted signal candidate vector $[x_1,x_2,x_3,x_4]^T$. The resulting 5 4-dimensional transmitted signal candidate vectors construct a candidate transmitted signal vector set S.

A ML solution is obtained from said set of transmitted signal candidate vectors S with a ML detection algorithm, wherein said ML solution is the signal detection result. In particular, this step comprises:

substituting each candidate vector in said set of transmitted signal candidate vectors S into the Euclidean distance calculating equation:

$$PED = \|y - h_1 x_1 - h_2 x_2 - \ldots - h_m x_m\|^2$$

and by using a ML detection algorithm, namely by taking the transmitted signal candidate vector with a minimum Euclidean distance PED as a ML solution, wherein said ML solution is signal detection result.

Figure 3:
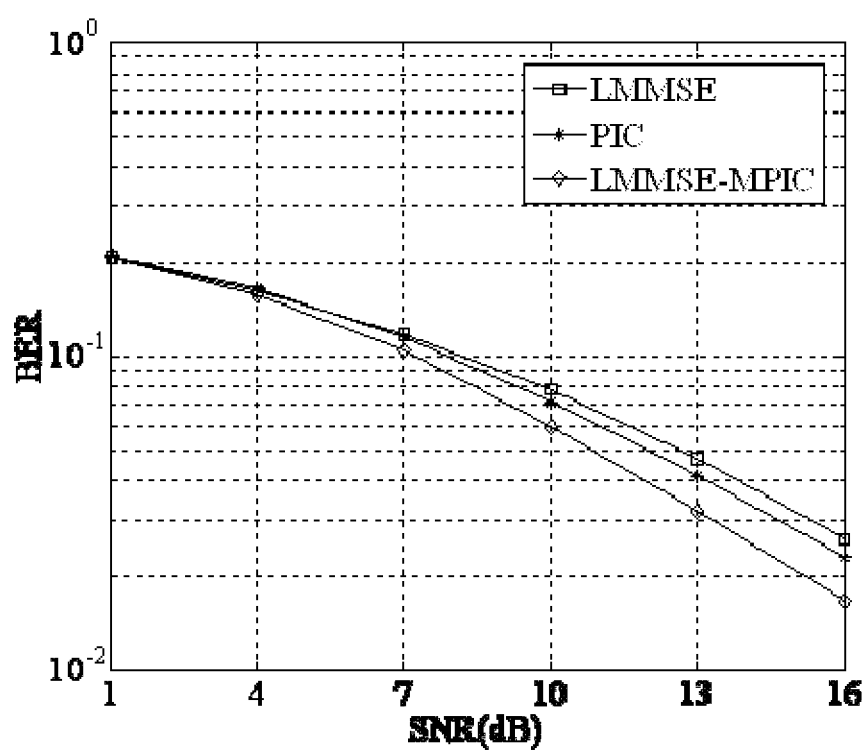
FIG. 3 illustrates graphs representing a simulation of the detection accuracy by using the signal detection method of the present invention in a MIMO communication system with 4 transmitting antennas and 4 receiving antennas

FIG. 3 illustrates a simulation result of the present invention in a 4 transmitting antennas and 4 receiving antennas LTE (3GPP Long Term Evolution) system. As shown in FIG. 3, the horizontal axis SNR indicates a signal-noise ratio, and the vertical axis BER indicates a bit error rate. The simulation conditions comprise: 16 QAM modulation, channel model being a channel as defined in 3GPP TS 36.211 standard, and the channel estimation being an ideal channel estimation. The involved detection algorithm comprises a conventional LMMSE detection, a conventional PIC detection, and signal detection method (LMMSE-MPIC) in the present invention. As can be seen from FIG. 3, the signal detection method in the present invention is significantly improved in detection performance over the LMMSE and PIC algorithms.

For complexity, the prior art ML detection algorithm has to traverse all possible combinations of transmitted signals. As for a MIMO communication system with 4 transmitting antennas and 4 receiving antennas, all possible combinations of transmitted signals amounts to $|\Omega|^4=16^4=65536$. By using the ML detection algorithm, it is required to calculate the Euclidean distance for 65536 times. While by using the signal detection method of the present invention, it is required to calculate the Euclidean distance for 6.25 times on average (FIG. 1 indicates that for a 2×2 system, it is required to calculate the Euclidean distance for 2.5 times on average by 16 QAM modulation). Although the detection performance of this method is slightly reduced, the range within which the ML detection algorithm has to search is greatly reduced, which reduces the times for signal detection.

It can be seen that the signal detection method of the present invention reaches a compromise between detection accuracy and detection complexity, the computational complexity during detection is greatly reduced, and the detection efficiency is improved significantly.

While one or more embodiments of the present invention have been illustrated in detail, the skilled artisan will appreciate that modifications and adaptations to those embodiments may be made without departing from the scope of the present invention as set forth in the following claims.

What is claimed is:

1. A Multiple Input Multiple Output (MIMO) communication system signal detection method being applied to a MIMO communication system with m transmitting antennas and n receiving antennas, wherein each transmitting antenna transmits a signal, while each receiving antenna receives all of m transmitted signals, the method comprising:

step 1, acquiring the received signals at said n receiving antennas from all of m transmitted signals, forming a received signal vector y, extracting channel information contained in the received signals of said n receiving antennas, and acquiring a channel matrix H from m transmitting antennas to n receiving antennas by using a channel estimation algorithm;

step 2, from the received signal vector y, calculating a m-dimensional transmitted signal preliminary estimation vector $[\hat{x}_1, \hat{x}_2, \ldots, \hat{x}_m]^T$, which corresponds to the m transmitted signals of said m transmitting antennas;

step 3, dividing said m transmitting antennas into groups, wherein each group consists of two transmitting antennas, and if appropriate, the last remaining transmitting antenna constitutes a group by itself;

step 4, from the channel matrix H, the received signal vector y, and the transmitted signal preliminary estimation vector of transmitting antennas except the group of transmitting antennas to be calculated, calculating a received signal component vector on said n receiving antennas which corresponds to transmitted signals of said group of transmitting antennas, and acquiring at least one possible transmitted signal vectors of said group of transmitted signal from said received signal component vector and said channel matrix H by using signal detect technique;

step 5, replacing a corresponding value in the m-dimensional transmitted signal preliminary estimation vector $[\hat{x}_1, \hat{x}_2, \ldots, \hat{x}_m]^T$ with each of the possible transmitted signal vectors from step 4, respectively, repeating step 4, calculating at least one possible transmitted signal vectors of transmitted signals of the next group of transmitting antennas with respect to the possible transmitted signal vector of each of the previous group of transmitting antennas, and finally obtaining the possible transmitted signal vectors of a tree structure of all groups of transmitting antennas;

step 6, composing a m-dimensional transmitted signal candidate vector from the possible transmitted signal vectors to which each leaf node of the tree structure and all ancestor nodes on the parent node path of the leaf node correspond, thus forming a complex m-dimensional transmitted signal candidate vectors which form a set of transmitted signal candidate vectors S;

step 7, obtaining a Maximum Likelihood (ML) solution from said set of transmitted signal candidate vectors S with a ML detection algorithm, said ML solution being a signal detection result of the m transmitted signals.

2. The MIMO communication system signal detection method of claim 1, wherein in said step 2, calculating said m-dimensional transmitted signal preliminary estimation vector $[\hat{x}_1, \hat{x}_2, \ldots, \hat{x}_m]^T$ with a Linear Minimum Mean Square Error (LMMSE) algorithm by using the following equation:

$$\hat{x}=(H^H H+\sigma^2 I)^{-1} H^H y,$$

wherein $\hat{x}=[\hat{x}_1, \hat{x}_2, \ldots, \hat{x}_m]^T$, $\sigma^2$ is a channel noise variance, $H^H$ is a hermit matrix of said channel matrix H, I is a unit matrix with a same dimension as that of $H^H H$, y is a received signal vector composed by the n receiving-antenna received signals.

3. The MIMO communication system signal detection method of claim 2, wherein H is a channel matrix of a dimension of n×m, and the element $h_{ji}$, i=1, 2, . . . , m, j=1, 2, . . . , n in the channel matrix indicates an impulse response of a subchannel from the $i^{th}$ transmitting antenna to the $j^{th}$ receiving antenna.

4. The MIMO communication system signal detection method of claim 1, wherein in said step 4, calculating a received signal component on said n receiving antennas which corresponds to transmitted signals of said group of transmitting antennas is accomplished by:

assuming that said group of transmitting antennas is the first group of transmitting antennas comprising a first and second transmitting antennas, then the received signal component vector for transmitted signals of the first and second transmitting antennas on said n receiving antennas is:

$$y_{12}=y-h_3\hat{x}_3-h_4\hat{x}_4-\ldots-h_m\hat{x}_m;$$

wherein $h_i$, i=3, 4, . . . m is a column vector of the channel matrix H, which indicates a vector composed by impulse responses of signal transmitted by the $i^{th}$ transmitting antenna on the n receiving antennas, $y_{12}$ is a received signal component vector of the first group of transmitted signals on said n receiving antennas, y is a received signal vector composed by the n receiving-antenna received signals.

5. The MIMO communication system signal detection method of claim 4, wherein in said step 4, acquiring at least one possible transmitted signal vectors of said group of transmitted signal from said group of received signal component vectors and said channel matrix H by using signal detect technique is accomplished by:

assuming that said group of transmitting antennas is the first group of transmitting antennas, and firstly calculating the parameters $a_1$, $a_2$, $b_1$, $b_2$, $c_1$, and $c_2$:

$$a_1 = h_2^H y_{12}, \; b_1 = h_2^H h_1,$$

$$c_1 = h_2^H h_2;$$

$$a_2 = h_1^H y_{12}, \; b_2 = h_1^H h_2,$$

$$c_2 = h_1^H h_1;$$

wherein $h_1$ and $h_2$ are column vectors of the channel matrix H, which indicate respectively vectors composed by impulse responses of signals transmitted by the first and second transmitting antennas on the n receiving antennas, $y_{12}$ is a received signal component vector of the first group of transmitted signals on said n receiving antennas, constructing a first modulation constellation $\Omega$ from the modulation order of said MIMO system with m transmitting antennas and n receiving antennas, wherein the first constellation $\Omega$ comprises $|\Omega|$ elements, said elements are complex symbols, and $|\Omega|$ corresponds to the modulation order of said MIMO system;

setting each element of the first modulation constellation $\Omega$ as complex symbols $x_1$ which will be assumed transmitted by the first transmitting antenna, and substituting them into the first function:

$$x_2 = \operatorname*{argmin}_{x \in \Omega} |x - (a_1 - b_1 x_1)/c_1|;$$

the element in the first constellation point set $\Omega$ which has the minimum distance between $(a_1 - b_1 x_1)/c_1$, as a complex symbol $x_2$ which is most possibly transmitted by the second transmitting antenna at the time the first transmitting antenna transmits the complex symbols $x_1$;

from the respective complex symbols $x_2$ which are most possibly transmitted by the second transmitting antenna, getting an element in the first constellation point set $\Omega$ which has the minimum distance between $(a_2 - b_2 x_2)/c_2$, as a complex symbol $x_1'$ which is most possibly transmitted by the first transmitting antenna at the time the second transmitting antenna transmit the complex symbols $x_2$ by using the second function:

$$x_1' = \operatorname*{argmin}_{x \in \Omega} |x - (a_2 - b_2 x_2)/c_2|;$$

for the same $x_2$, comparing its corresponding $x_1$ and $x_1'$; if equal, setting $[x_1, x_2]^T$ as possible transmitted signal vectors for the first group of transmitted signals, and combining the qualified $[x_1, x_2]^T$ into a set of possible transmitted signal vectors for the first group of transmitted signals $S_1$, namely, $[x_1, x_2]^T \in S_1$; if not equal, abandoning the corresponding $x_1$ and $x_1'$;

wherein $$Q(x) = \operatorname*{argmin}_{x \in \Omega} |x - (a_i - b_i x_i)/c_i|, \; i = 1, 2, \ldots, m,$$

namely, the function value is an element in the first constellation point set $\Omega$ which has the minimum distance between $(a_i - b_i x_i)/c_i$.

6. The MIMO communication system signal detection method of claim 5, wherein in said step 4, calculating said group of received signal components for the transmitted signals of said group of transmitting antennas on said n receiving antennas is accomplished by:

assuming that said group of transmitting antennas is a second group of transmitting antennas comprising the third and fourth transmitting antennas, wherein one of the possible transmitted signal vectors for the first group of transmitting antennas has replaced the m-dimensional transmitted signal preliminary estimation vectors $\hat{x}_1$, $\hat{x}_2$ and become $x_1$ and $x_2$:

$$y_{34} = y - h_1 x_1 - h_2 x_2 - h_5 \hat{x}_5 - \ldots - h_m \hat{x}_m,$$

wherein $[x_1, x_2]^T \in S_1$, namely, the possible number of $y_{34}$ depends on the number of $[x_1, x_2]^T$ contained in the set of possible transmitted signal vectors for the first group of transmitting antennas $S_1$, $y_{34}$ is a received signal component vector for the second group of transmitted signals on said n receiving antennas, y is the received signal vector composed by the n receiving-antenna received signals.

7. The MIMO communication system signal detection method of claim 6, wherein in said step 4, acquiring at least one possible transmitted signal vectors of said group of transmitted signal from said group of received signal component vectors and said channel matrix H by using signal detection technique is accomplished by:

assuming that said group of transmitting antennas is the second group of transmitting antennas, firstly calculating the parameter $a_3$, $a_4$, $b_3$, $b_4$, $c_3$, and $c_4$:

$$a_3 = h_4^H y_{34}, \; b_3 = h_4^H h_3, \; c_3 = h_4^H h_4;$$

$$a_4 = h_3^H y_{34}, \; b_4 = h_3^H h_4, \; c_4 = h_3^H h_3;$$

and based on said function $Q(x)$, obtaining the set of possible transmitted signal vectors for the second group of transmitted signals $S_2$ to which respective $y_{34}$ corresponds, wherein the number of $S_2$ depends on the possible number of $y_{34}$.

8. The MIMO communication system signal detection method of claim 7, wherein in said step 7, obtaining a ML solution from said set of transmitted signal candidate vectors S with a ML detection algorithm is accomplished by:

substituting each candidate vector in said set of transmitted signal candidate vectors S into the Euclidean distance calculating equation:

$$\text{PED} = \|y - h_1 x_1 - h_2 x_2 - \ldots - h_m x_m\|^2,$$

wherein $h_i$, $i = 1, 2, \ldots, m$, is a column vector of the channel matrix H, which indicates a vector of impulse response of the signal transmitted by the $i^{th}$ transmitting antenna on the n receiving antennas, y is a received signal vector composed by the n receiving-antenna received signals, $x_1, x_2, \ldots, x_m$ are the calculated transmitted complex symbols form the first to $m^{th}$ transmitting antennas.

9. The MIMO communication system signal detection method of claim 1, wherein when the number of transmitting antennas m is an even number, the transmitted signal vector for the last group of transmitting antennas is always the transmitted signal preliminary estimation vector, and is not replaced by the calculated value.

* * * * *